O. LINDEMANN.
Bird-Cages.
No. 157,012.  Patented Nov. 17, 1874.
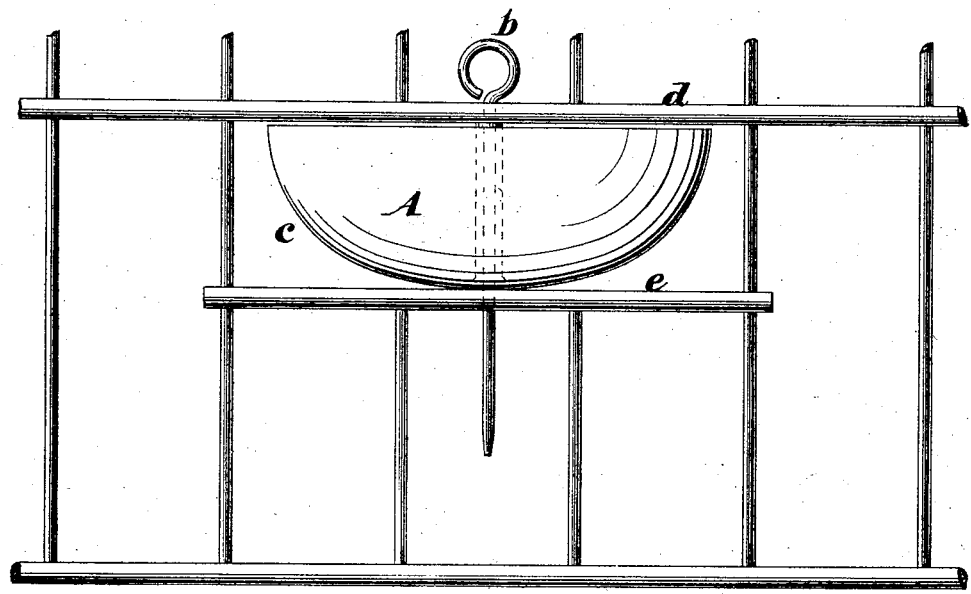
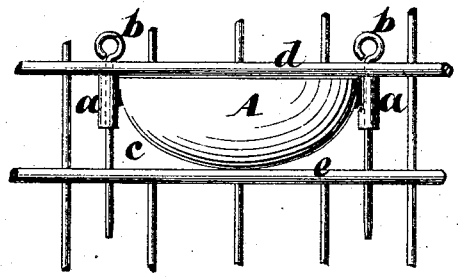
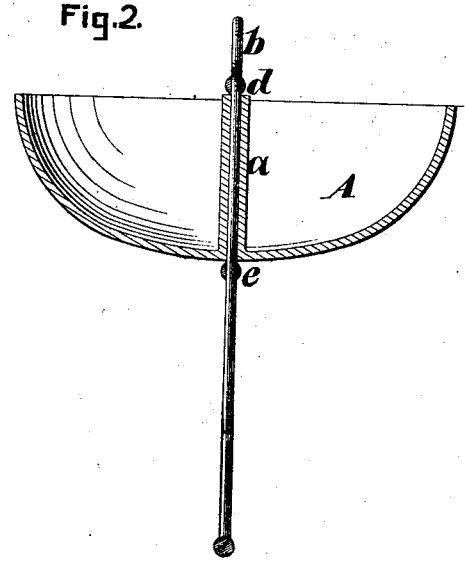
Witnesses.
Henry Gentner
Chas. Wahlers
Inventor.
Otto Lindemann
per
Van Santvoord & Hauff
Attys.

UNITED STATES PATENT OFFICE.

OTTO LINDEMANN, OF EDGEWATER, NEW YORK.

IMPROVEMENT IN BIRD-CAGES.

Specification forming part of Letters Patent No. 157,012, dated November 17, 1874; application filed October 7, 1874.

*To all whom it may concern:*

Be it known that I, OTTO LINDEMANN, of Edgewater, in the county of Richmond and State of New York, have invented a certain new and useful Improvement in Animal and Bird Cages, of which the following is a specification:

This invention is illustrated in the accompanying drawing, in which—

Figure 1 represents a side elevation of a portion of a cage containing my improvement. Fig. 2 is a transverse vertical section of the same. Fig. 3 is a modification of the same.

Similar letters indicate corresponding parts.

This invention consists in a feed-cup, which is provided with one or more sockets for the reception of one or more pins, extending through one of the cross-bands of the cage and through the supporting-bar of the feed-cup, in such a manner that said feed-cup can be readily removed and reinserted, and that when it is secured in position it cannot be displaced by a strong bird, such as a parrot, or by a squirrel or other animal, and at the same time the feed-cup can be readily made of cast-iron or other strong and durable material, which the bird or animal occupying the cage cannot destroy.

In the drawing, the letter A designates my feed-cup, which is, by preference, cast of iron, but it may be made of any other suitable material. From the bottom of this cup rises a boss, $a$, to a level with the edge of the cup, and said boss is bored out to receive a pin, $b$. The cage B is provided with an open space, $c$, for the reception of the feed-cup. This space is situated between one of the cross-bands $d$ and a bar, $e$, that forms the support for the cup A, and both the cross-band and the supporting-bar $e$ are provided with holes situated opposite to each other for the reception of the pins $b$. When the feed-cup has been secured in position by passing the pin $b$ through the hole in the cross-band $d$, then through the socket in the boss $a$, and finally through the hole in the supporting-bar $e$, it can only be removed by raising the pin up in the direction of its length, and since the birds or animals occupying a cage in trying to remove the pin $b$, will invariably pull inwardly, they are never able to displace my feed-cup. At the same time, in order to nest the cages, my feed-cup can be readily taken out, and afterward reinserted without trouble. At the same time my feed-cup can be cast of iron and enameled on its inner surface, so that it is cheap, and not injurious to the health of birds or animals; and furthermore, it is sufficiently strong to resist the attacks of a powerful bird, such as a parrot, or of animals, such as squirrels.

It is obvious that my feed-cup can be made of any desirable size, and it can be used for water or for solid food with equal advantage. In practice I prefer to make the feed-cup circular, with the boss $a$ rising from the center of its bottom, so that the cup can be turned on its pin $b$, and the bird or animal in the cage can get access to all parts of the cup.

My cup may, however, be made in any desirable form or shape; and the boss $a$ instead of rising from the bottom of the cup may be formed on any part of the same, or two or more lugs may be made to project from the sides of the cup, and the cup may be secured in position by two pins, one on each side, as shown in Fig. 3.

What I claim as new, and desire to secure by Letters Patent, is—

1. A feed-cup for an animal or bird cage, provided with a boss, $a$, rising from its bottom, and bored out to receive a pin, $b$, substantially as shown and described.

2. The combination of a feed-cup, A, having one or more hollow bosses or lugs, $a$, for the reception of the pin or pins $b$, with the perforated cross-band $d$ and perforated supporting-bar $e$ of a bird-cage, substantially as set forth.

In testimony that I claim the foregoing I have hereunto set my hand this 29th day of September, 1874.

OTTO LINDEMANN.

Witnesses:
W. HAUFF,
E. F. KASTENHUBER.